United States Patent [19]

Bietenhader et al.

[11] Patent Number: 5,293,974

[45] Date of Patent: Mar. 15, 1994

[54] DEVICE FOR THE TRANSMISSION OF STATIC FORCES AND FOR THE FILTRATION OF VIBRATORY EXCITATIONS BETWEEN TWO COMPONENTS

[75] Inventors: Claude Bietenhader, Lambesc; Maurice Blanc, Eguilles, both of France

[73] Assignee: Societe Anonyme dite: Aerospatiale Societe Nationale Industrielle, Paris, France

[21] Appl. No.: 848,739

[22] Filed: Mar. 10, 1992

[30] Foreign Application Priority Data

Mar. 25, 1991 [FR] France .................. 91 03582

[51] Int. Cl.$^5$ .................................. F16F 7/10
[52] U.S. Cl. .................. 188/379; 244/17.27
[58] Field of Search ............... 188/378–380; 244/17.27; 267/136, 162, 228; 248/568, 569; 416/145, 500; 74/99 R, 105

[56] References Cited

U.S. PATENT DOCUMENTS

| 3,288,419 | 11/1966 | Wallerstein | 248/358 |
| 3,743,266 | 7/1973 | Sturman et al. | 267/162 |
| 4,403,681 | 9/1983 | Desjardins | 188/379 |
| 4,431,148 | 2/1984 | Mouille | 244/17.27 |
| 4,974,794 | 12/1990 | Aubry et al. | 267/136 |

FOREIGN PATENT DOCUMENTS

| 0765563 | 9/1980 | U.S.S.R. | 267/228 |
| 1634864 | 3/1991 | U.S.S.R. | 188/379 |

*Primary Examiner*—Andres Kashnikow
*Assistant Examiner*—Chris Schwartz
*Attorney, Agent, or Firm*—Marshall, O'Toole, Gerstein, Murray & Borun

[57] ABSTRACT

The present invention relates to a device for elastic connection between two components in order to transmit the static forces from one to the other in the axis of the device and to filter the associated vibratory excitations, comprising an elastic return mechanism (4) connected to a first and a second component and at least one swinging mass (5) located at one end of a lever arm, the lever arm articulated, in the vicinity of its other end, on the first and second components. The lever arm (6) consists of at least two portions (7, 8) articulated on one another, the first portion (7) being articulated on the first (2) and second (3) components in the vicinity of its end (7a) opposite that (7b) articulated on the second portion (8), and the second portion (8) being articulated, in the vicinity of its end (8a) articulated on the first portion (7), on the second component (3) and carrying the mass (5) at its opposite end (8b).

14 Claims, 7 Drawing Sheets

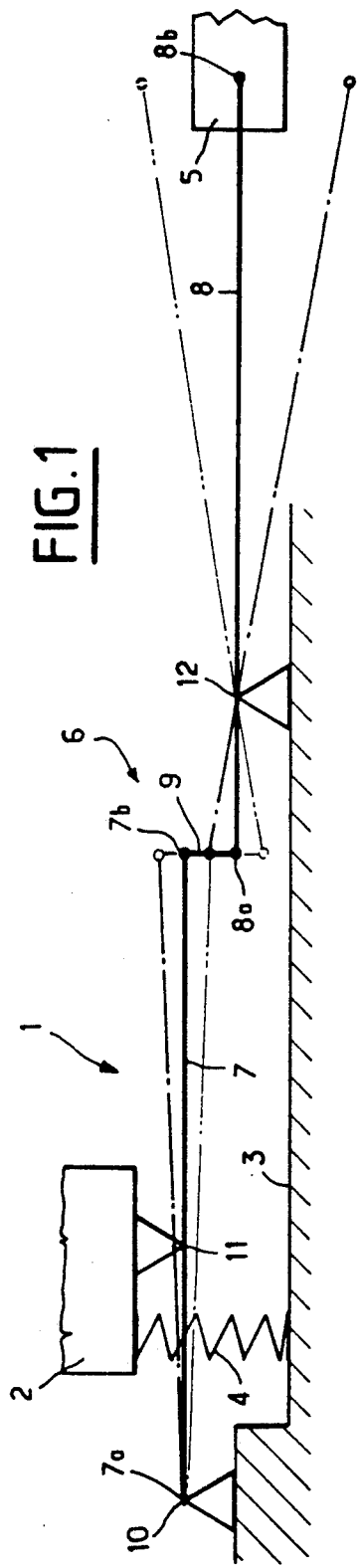
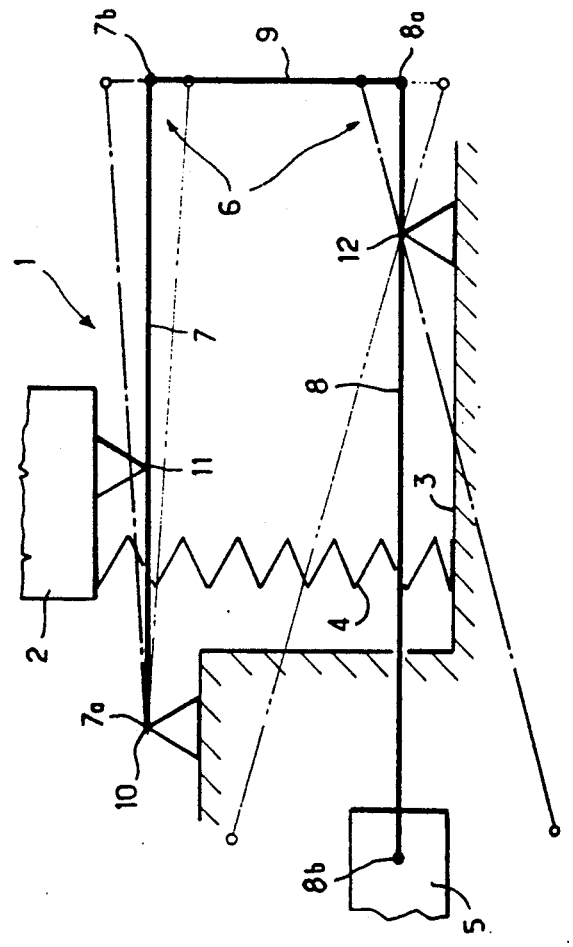

DEVICE FOR THE TRANSMISSION OF STATIC FORCES AND FOR THE FILTRATION OF VIBRATORY EXCITATIONS BETWEEN TWO COMPONENTS

FIELD OF THE INVENTION

The present invention relates to a device for elastic connection between two components in order to transmit the static forces from one to the other in the axis of the device and simultaneously to filter the associated coaxial vibratory excitations which are transmitted from one to the other.

More particularly, although not exclusively, such a device can be used in the suspension connecting the main transmission case to the fuselage of a rotor aircraft, such as a helicopter, for filtering the vibrations generated by the rotor and transmitted to the fuselage of said aircraft by said transmission case.

PRIOR ART

The Patent FR-2,499,505 in particular makes known such a device, called hereafter an "insulator", integrated in the suspension connecting the main transmission case and the fuselage of a helicopter. The suspension described in the abovementioned document comprises, on the one hand, an axially flexible and radially rigid diaphragm for absorbing the engine-torque reaction, located under the main transmission case in the region of the upper structure of the fuselage, and, on the other hand, bars for transmitting the forces originating from the rotor and insulators of unidirectional action arranged in a plane parallel to the fuselage. As is customary, each insulator has two functions: a "rigidity" function and an "anti-resonance" function. In this case, the rigidity function is ensured by a flexible blade connected, on the one hand, to the fuselage and, on the other hand, to the bottom of the main transmission case. Moreover, each bar is connected to the respective blade at the free end of the latter, external to the stays of the abovementioned blade. As regards the anti-resonance function, this is ensured by a mass located at one end of a lever arm, the other end of which is connected to the flexible blade.

However, the presence of such a lever arm entails a large overall size for an insulator with mechanical amplification of this type, thus restricting the possible amplification if reasonable limits both of overall size and of mass are not to be exceeded.

To avoid this disadvantage, there is a known insulator using a "fluid lever", that is to say a device in which a low-viscosity fluid acts as a stroke-increasing lever on a shaft and a mass which are fixed to a spring. More specifically, a device of this type, described in the Patent FR-2,629,545, comprises an outer cylinder fixed to the fuselage of a rotor aircraft at its lower end and an inner cylinder fixed at its upper end to the main transmission case, an elastomeric bearing between the two cylinders ensuring the rigidity function. The central part of the inner cylinder and two hollow shafts serve as guidance for a mass mounted slidably on said shafts and are filled with low-viscosity oil. The variation in volume of the chambers located at the ends of the inner cylinder brings about the displacement of the mass over an amplified stroke, thereby making it possible to ensure the anti-resonance function. However, such an insulator with hydraulic stroke amplification is also not without disadvantages. In fact, the rigidity of the elastomer tends to vary with the temperature and in the course of time. Furthermore, the low-viscosity oil risks leaking, whilst a full oil level is difficult to obtain without a bleed system. Other difficulties associated with the use of a fluid, such as oil, namely expansion and freezing, could also be mentioned.

SUMMARY OF THE INVENTION

To avoid the disadvantages relating, on the one hand, to anti-resonance devices with mechanical amplification and, on the other hand, to anti-resonance devices with hydraulic amplification, the present invention relates to a device for the transmission of axial static forces and for the filtration of vibratory excitations with mechanical amplification, improved so as to reduce its overall size, whilst at the same time preserving an amplification ratio at least equal to that of the prior devices of the same type.

For this purpose, the device for elastic connection between two components in order to transmit the static forces from one to the other in the axis of the device and to filter the coaxial vibrations between the first and the second component, of the type comprising elastic return means connected to said first and second components and at least one swinging mass located at one end of a lever arm articulated, in the vicinity of its other end, on said first and second components, is notable, according to the invention, in that said lever arm consists of at least two portions articulated on one another, the first portion being articulated on said first and second components in the vicinity of its end opposite that articulated on the second portion, and the second portion being articulated, in the vicinity of its end articulated on the first portion, on the second component and carrying said swinging mass at its opposite end.

Thus, the provision of at least two amplification "stages" multiplying their respective effects makes it possible to reduce the total length of the lever arm for the same amplification value and therefore to decrease the overall size of the device or, all things otherwise being equal, to reduce the value of the swinging mass.

Advantageously, said first and second portions are articulated on one another by means of a connecting rod.

Moreover, said first and second portions can be arranged substantially in the extension of one another. However, in order further to reduce the overall size of the device, it is preferable if said first and second portions are arranged opposite one another in parallel and in a spaced manner.

According to a preferred embodiment of the invention, the device comprises a first elongate element fixed to the first component subjected to a static and dynamic load and a second tubular elongate element fixed to the second component liable to receive the static load and the filtered vibratory excitations, said first and second elongate elements being arranged coaxially and being capable of sliding longitudinally relative to one another, and said elastic return means being provided between them.

Preferably, said first elongate element is articulated on said first portion of the lever arm, and said second elongate element is articulated, on the one hand, on said first portion of the lever arm at its end remote from the articulation on said second portion and, on the other hand, on said second portion.

According to other characteristics of the invention, the elastic return means can consist either of a plurality of elastic washers seated on the inside of two "bell"-shaped housings which are located opposite one another and of which one is fixed to said first elongate element and the other is fixed to said second elongate element, or of a band extending parallel to the longitudinal axis of the first and second elongate elements, at the same time forming a closed loop by passing over two spools, of which one is fastened to said first elongate element and the other to said second elongate element. In particular, said band can be produced from a material based on glass fibers coated with synthetic resin, especially thermoset, or agglomerated by the latter.

To ensure the guidance of said elongate elements, axially flexible and radially rigid guide diaphragms, each fixed to said first and second elongate elements, can be provided between said first and second elongate elements. Preferably, annular pieces are provided between said first and second elongate elements, so as to continue to ensure the centering of said elements in the event of a breakage of said diaphragms.

Furthermore, at least one of said annular pieces can be vertically adjustable by means of a thread provided on its outer periphery, and a nut can be provided at the end, internal to the second elongate element, of the first elongate element, said nut being capable of coming into abutment against a corresponding shoulder of the second elongate element.

According to other characteristics of the invention, the articulation between the second elongate element and the first portion of the lever arm consists of a flexible blade fastened to said second elongate element and to said first portion and parallel to the longitudinal axis of said device or, alternatively, of a link, the ends of which are articulated respectively on the second elongate element and on said first portion, whilst the articulations between the first elongate element and the first portion of the lever arm and between the first portion and the connecting rod each consist of an axle mounted on laminated bearings, and the articulations between the second portion of the lever arm and the connecting rod and between the second elongate element and the second portion each consist of an axle mounted on needle and/or ball bearings.

The Figures of the accompanying drawing will make it easy to understand how the invention can be put into practice. In these Figures, identical references denote like elements.

BRIEF DESCRIPTION OF THE DRAWINGS

FIGS. 1 and 2 are basic diagrams illustrating two versions of the device according to the invention.

DESCRIPTION OF THE PREFERRED EMBODIMENTS

Figure 3:
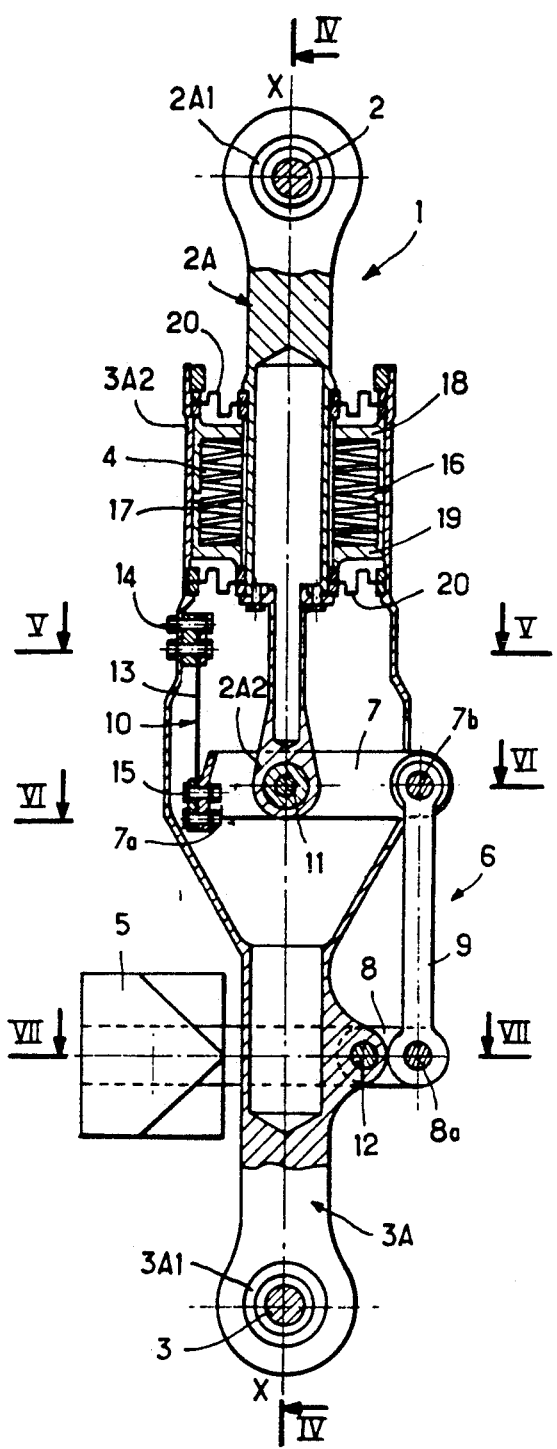
FIG. 3 is a longitudinal section through a first exemplary embodiment of the device of the invention.
Figure 4:
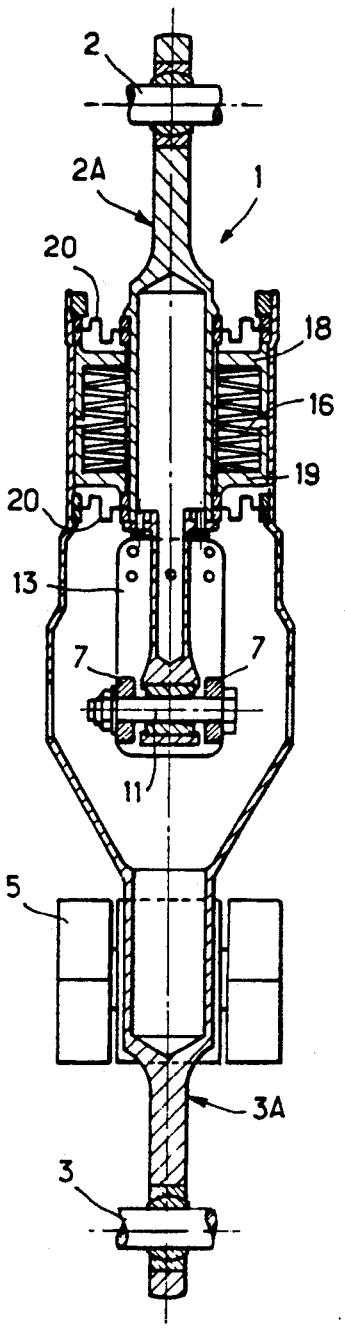
FIG. 4 is a section along the line IV—IV of FIG. 3.
Figure 5:
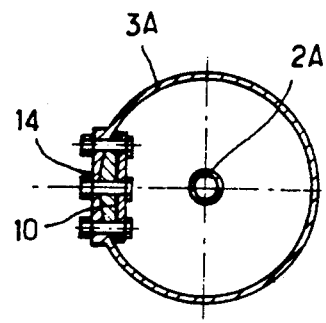
FIGS. 5, 6 and 7 are different cross-sections respectively along the lines V—V, VI—VI and VII—VII of the device of FIG. 3.

FIGS. 1 and 2 show basic diagrams of two versions of the device according to the invention. In these two Figures, the device 1 for transmitting static forces and for filtering vibratory excitations between the first 2 and second 3 components comprises elastic return means 4 and a mass 5 located at one end of a lever arm 6 articulated, in the vicinity of its other end, on said first 2 and second 3 components.

More particularly, according to the invention, the lever arm 6 comprises two portions 7, 8 articulated on one another by means of a connecting rod 9, as illustrated. Moreover, the first portion 7 is articulated at 10 and 11 on the components 3 and 2, respectively, in the vicinity of its end 7a opposite that 7b articulated on the second portion 8, whilst the latter is articulated, in the vicinity of its end 8a articulated on the first portion 7, on the second component 3 at 12 and carries the mass 5 at its opposite end 8b.

As illustrated in FIG. 1, the first and second portions 7, 8 of the lever arm 6 can extend substantially in the extension of one another, at least when the device 1 is not subjected to vibrations. As will be seen in more detail later, this arrangement makes it possible already to reduce the overall size of the lever arm in comparison with a one-piece lever arm for an identical amplification ratio. However, to reduce this overall size further, it is advantageous, as illustrated in FIG. 2, if said first and second portions 7, 8 of the lever arm 6 extend opposite one another in parallel and in a spaced manner. It may be noted that the portions 7, 8 are, of course, parallel only in the state of rest of the device 1.

Figure 7:
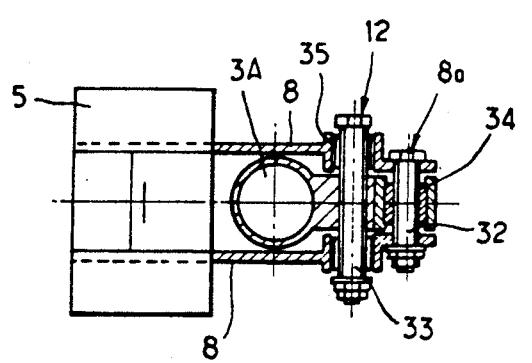
Figure 8:
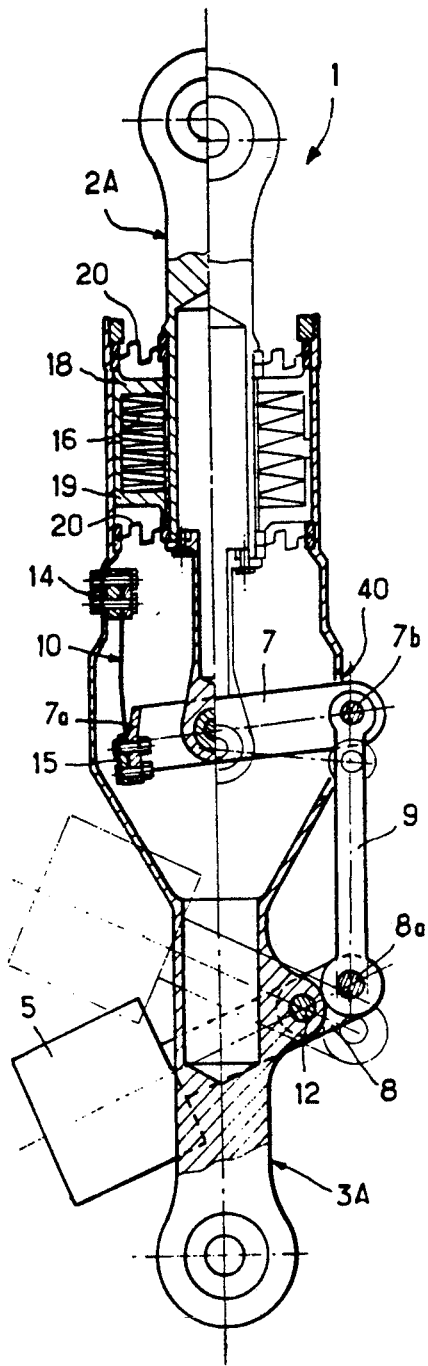
FIG. 8 is a view similar to that of FIG. 3, illustrating the functioning of this first exemplary embodiment of the device of the invention.
Figure 9:
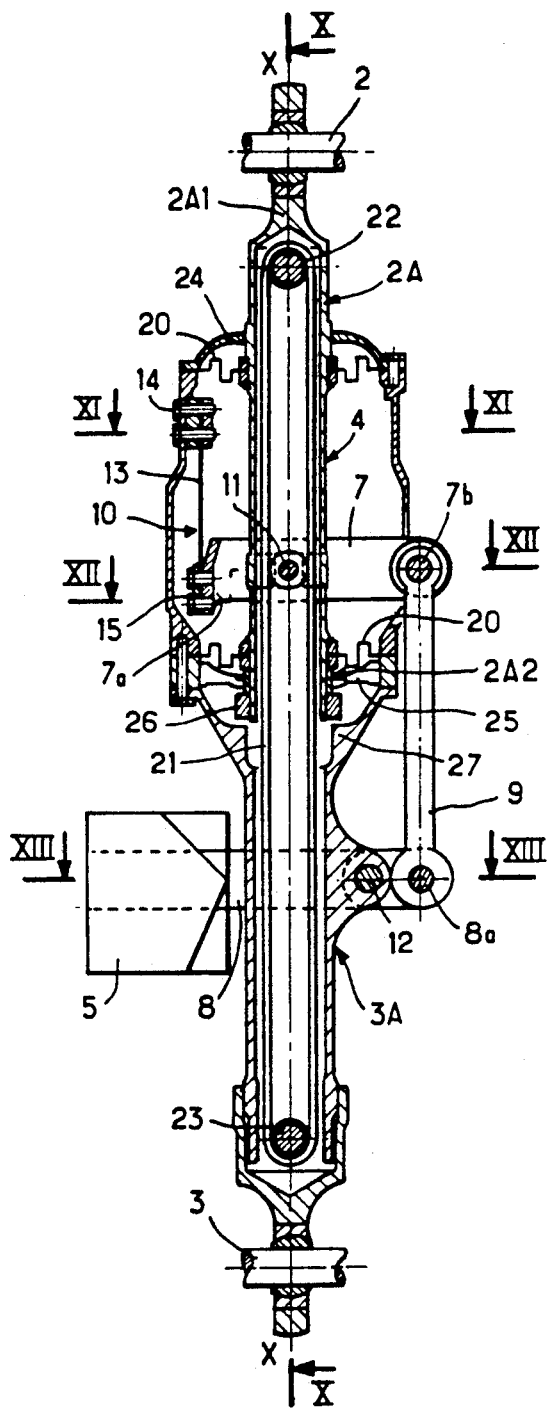
FIG. 9 is a longitudinal section through a second exemplary embodiment of the device of the invention.
Figure 10:
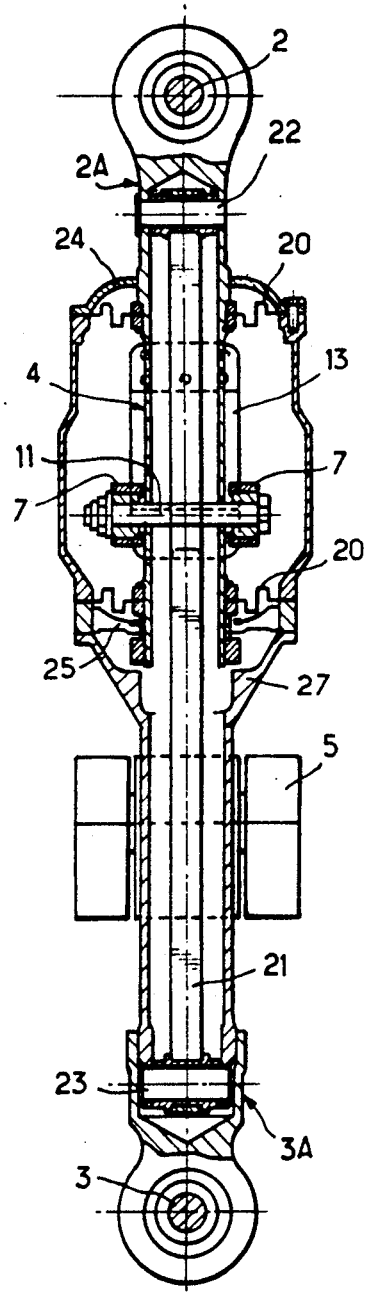
FIG. 10 is a section along the line X—X of FIG. 9.
Figure 11:
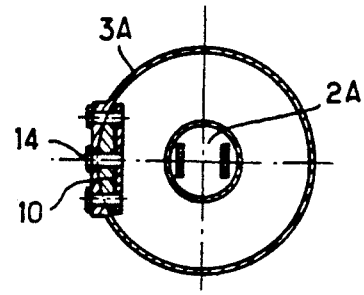
FIGS. 11, 12 and 13 are different cross-sections along the respective lines XI—XI, XII—XII and XIII—XIII of the device of FIG. 9.

Reference will now be made to FIGS. 3–8 and 9–14 which illustrate two actual exemplary embodiments of the device 1 of the invention and which repeat the various elements described with reference to FIGS. 1 and 2 in the arrangement shown diagrammatically in FIG. 2, such as the portions 7, 8 of the lever arm 6, the connecting rod 9 and the various articulations 10, 11, 12 and 7b,8a, as well as the mass 5 and the elastic return means 4. In these two examples, the device 1 comprises a first elongate element 2A extending parallel to the longitudinal axis X—X of the device 1, fixed to a first component 2 (of which only the axle connecting it to the device 1 is illustrated) at a first end 2A1 and articulated at 11 on the portion 7 of the lever arm 6 at its end 2A2 (FIG. 3) or in the vicinity of the latter (FIG. 9). Furthermore, a second tubular elongate element 3A fixed to the second component 3 at a first end 3A1 partially surrounds the first element 2A. Said first and second elements 2A and 3A are arranged coaxially and can slide longitudinally relative to one another in parallel to the axis X—X, said elastic return means 4 being provided between them. Moreover, the element 3A is articulated on the portion 8 of the lever arm 6 at 12 and on the portion 7 of the lever arm 6 at 10 by means of a flexible blade 13 fastened at 14 to the middle part of the element 3A and at 15 to the end 7a of the portion 7, the flexible blade 13 extending parallel to the longitudinal axis X—X, this flexible blade being replaceable by a link articulated on the same elements.

Where the first embodiment (FIGS. 3-8) is concerned, the elastic return means 4 consist of a plurality of elastic washers 16 centered on a spacer 17 and seated on the inside of two "bell"-shaped housings which are arranged opposite one another and of which one 18 is fixed to the element 3A and the other 19 is fixed to the element 2A. A movement between the components 2 and 3 therefore results in a compression (or a traction) of the elastic washers 16, as can be seen particularly in FIG. 8.

Moreover, to ensure the guidance of the movable parts, two axially flexible and radially rigid diaphragms 20 produced, for example, from titanium are mounted respectively on either side of the assembly of elastic washers 16 and of their housings 18, 19, each being fixed to the elements 2A and 3A.

As regards the second embodiment illustrated in FIGS. 9-14, the elastic return means 4 consist of a band 21 which can be produced from a material based on glass fibers coated with synthetic resin, especially thermoset, and which extends parallel to the longitudinal axis X—X, at the same time forming a closed loop by passing over two spools 22, 23, of which one 22 is fastened to the element 2A fixed to the component 2 and the other 23 is fastened to the element 3A fixed to the component 3. A traction between the components 2 and 3 results in a traction of the band 21. It may be noted, however, that the rigidity (spring) function is ensured essentially for a traction of the band, this being explained by the use of glass fibers of which the general direction is parallel to the longitudinal axis X—X. Under compression, the rigidity is near to zero. But this does not present any special problem, particularly in respect of this specific use described hereafter with reference to FIG. 15.

As in the preceding exemplary embodiment (FIGS. 3-8), the two diaphragms 20 ensure the guidance of the movable parts. In this case, however, annular pieces 24, 25 are provided so as to continue to ensure the centering of the movable parts in the event of a breakage of the diaphragms 20. It would, of course, also be possible to consider providing such pieces 24, 25 in the first embodiment.

Furthermore, to guarantee that the nominal length of the assembly is maintained, whilst at the same time preserving a tension in the glass fibers, an adjustment of length at one of the ends of the band can be provided. Moreover, the limit-stop abutments are ensured by the annular piece 25 vertically adjustable by means of a thread provided on its outer periphery. Under compression, the abutment occurs between the nut 26 at the end of the element 2A and the corresponding shoulder 27 of the element 3A.

Figure 14:
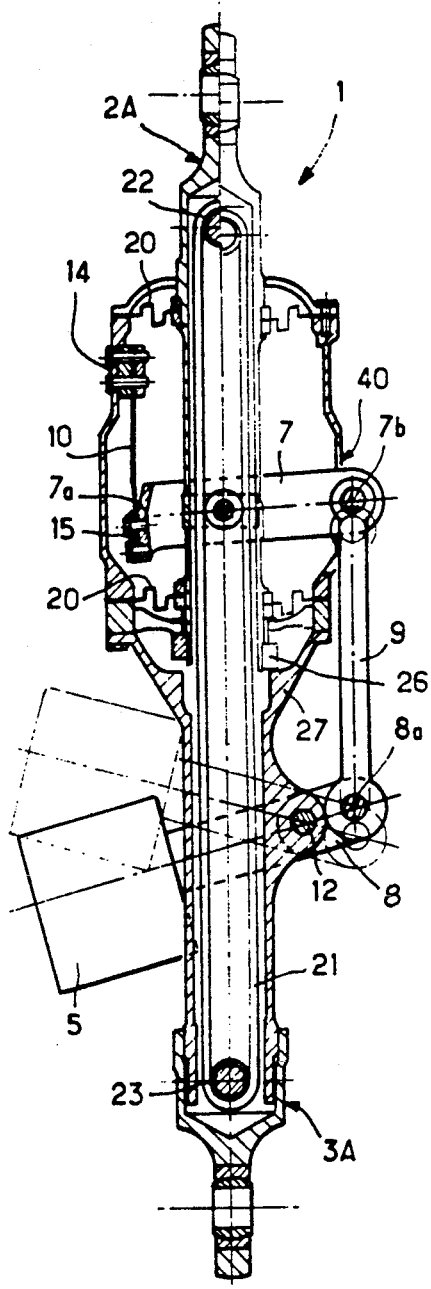
FIG. 14 is a view similar to that of FIG. 9, illustrating the functioning of this second exemplary embodiment of the device of the invention.

. As an example of amplification for the device of the invention, reference will be made once again to FIGS. 1 and 2, in which dot-and-dash lines represent the deflection of the mass 5 corresponding to an amplification ratio of 10. This is obtained by a ratio of 2.5 on the first amplification "stage" (first portion 7 of the lever arm 6) and of four on the second (second portion 8 of the lever arm 6) . The distribution of the amplification ratios between the first and second stages is carried out by taking into account, in particular, the minimum overall size of the assembly and the stresses associated with the mounting of the components. It can be seen that, in the illustrated example and all else otherwise being equal, an amplification ratio of 10 would, where a one-piece lever arm is concerned, require a length of the latter equal to 410 mm. In FIG. 1, this "overall size" is no more than 225 mm, and of course it is even smaller in FIG. 2. FIGS. 8 and 14 likewise illustrate the functioning of the device of the invention for the more specific examples illustrated, and in particular the deflection of the mass 5 and the movement of the portions 7 and 8 of the lever arm under traction and under compression. An aperture 40 is provided for this purpose in the corresponding middle part of the element 3A.

As already mentioned, for the articulation 10, and in view of the small angle of rotation (7° at most) and of the slight radial displacement (0.1 mm at most) which this articulation has to undergo,, use can advantageously be made, as illustrated, of a flexible blade, especially made of titanium, the specific characteristics (especially length, width and thickness) of which depend on the particular use in question.

Figure 6:
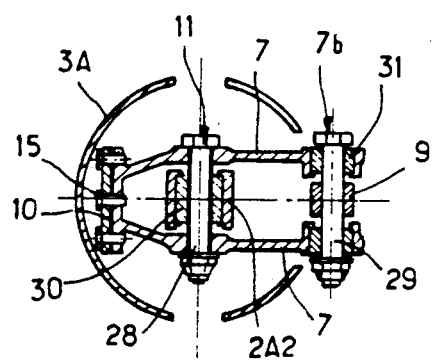
Figure 12:
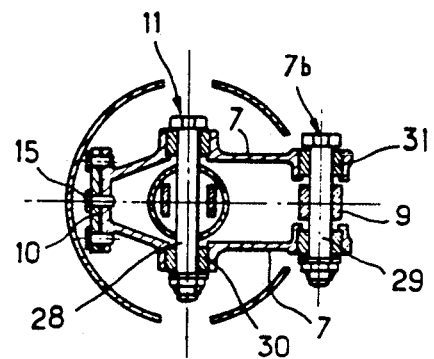

For the articulations 11 and 7b, in view of the small angle of rotation (7° at most), the high radial rigidity and the absence of play and friction which these articulations must have, use can advantageously be made, as illustrated more particularly in FIGS. 6 and 12, of respective axles 28, 29 mounted on laminated bearings 30, 31. As above the specific characteristics, particularly of the laminated bearings, depend on the particular use in question. The specific characteristics of the bearings likewise depend on the particular use in question.

Figure 13:
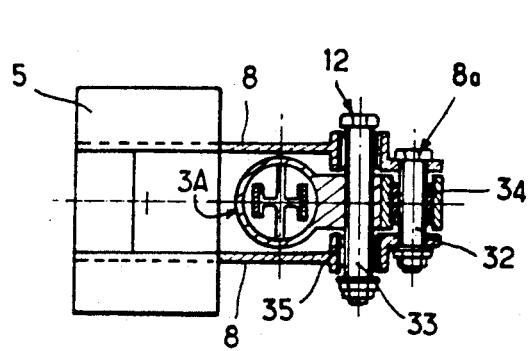

For the articulations 8a and 12, in view of the large angle of rotation (approximately 30° at most), use can advantageously be made, as illustrated in FIGS. 7 and 13, of respective axles 32, 33, mounted on needle bearings 34 (axles 32) or combined needle and ball bearings 35 (axles 33). The specific characteristics of the bearings likewise depend on the particular use in question.

FIGS. 6, 7 and 12, 13 also show the double-bar structure, used in these exemplary embodiments, of the lever-arm portions 7 and 8.

Figure 15:
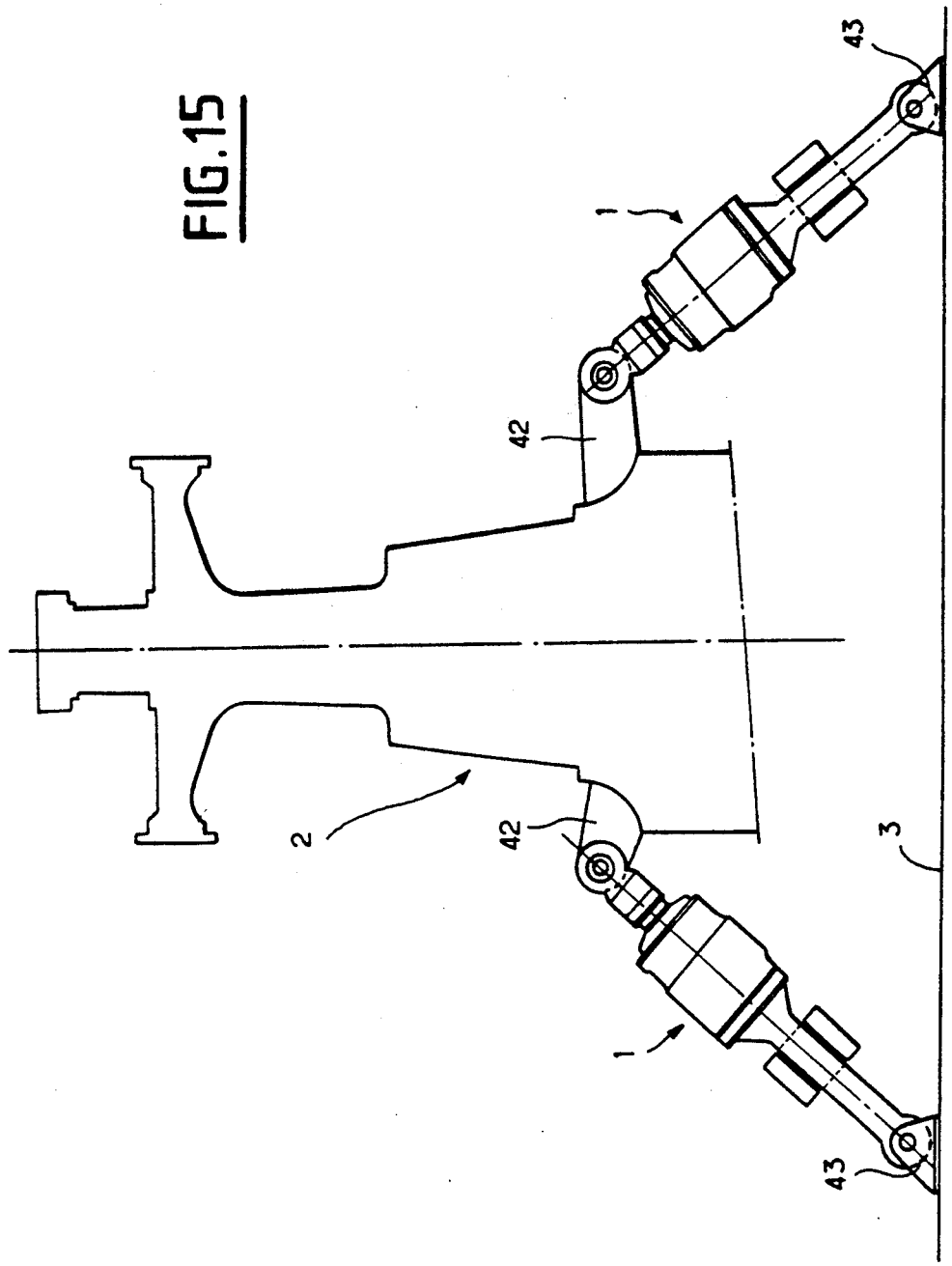
FIG. 15 shows the arrangement of devices of the invention between the main transmission case and the fuselage of a helicopter.

An example of the installation of devices 1 according to the invention is illustrated in FIG. 15. In this case, each device 1 is arranged between the main transmission case 2 of a helicopter and the fuselage 3 of the latter, and four such identical devices can be provided for transmitting the static forces and moments between the main transmission case and the structure of the fuselage and for filtering the dynamic excitations generated by the supporting and propelling rotor of the helicopter. Each device 1 is fastened to the main transmission case 2 and to the fuselage 3 by means of respective yokes 42 and 43.

We claim:

1. A device for elastic connection between first and second components, for transmitting static forces from said first component to said second component along a vertical axis of the device and for filtering coaxial vibrations between said first and second components, said device comprising elastic return means (4) connected between said first and said second components, at least one swinging mass located at one end of a lever arm (6) said lever arm having another end pivotally connected to said first and second components, a first elongate element (2A) directly connected to said first component (2) and a second tubular elongate element (3A) directly connected to said second component (3), said first (2A) and second (3A) elongate elements being arranged coaxially and being capable of sliding longitudinally relative to each other, said lever arm (6) consisting of at least two portions (7,8) pivotally connected to one another, a first portion (7) of said lever arm (6) being pivotally connected to said first and second elongate elements (2A,3A), said second portion (8) of said lever arm (6) being pivotally connected to said first and second elongate elements (2A,3A), said second portion (8) being pivotally connected to said first portion (7) of said lever arm at one end and carrying said swinging mass (8) at an opposite end (8b).

2. The device as claimed in claim 1, wherein axially flexible and radially rigid guide diaphragms (20), each fixed to said first (2A) and second (3A) elongate elements, are provided between said first (2A) and second (3A) elongate elements.

3. The device as claimed in claim 2, wherein annular pieces (24,25) are provided between said first (2A) and second (3A) elongate elements, to ensure the centering of said elements upon breakage of said diaphragms.

4. The device as claimed in claim 3, wherein at least one (25) of said annular pieces is vertically adjustable by means of a thread provided on its outer periphery.

5. The device as claimed in claim 1, wherein said first (7) and second (8) portions are pivoted on each other by means of a connecting rod (9).

6. The device as claimed in claim 5, wherein the connection between the first elongate element (2A) and the first portion (7) of the lever arm (6) and between the first portion (7) and the connecting rod (9) each consist of an axle (28,29) mounted on laminated bearings (30,31).

7. The device as claimed in claim 5, wherein the pivots connection between the second portion (8) of the lever arm (6) and the connecting rod (9) and between the second elongate element (3A) and the second portion (8) each consist of an axle (32,33) mounted on needle and/or ball bearings (34,35).

8. The device as claimed in claim 1, wherein said elastic return means (4) consists of a band (21) extending parallel to the longitudinal axis (X—X) of the first (2A) and second (3A) elongate elements, at the same time forming a closed loop by passing over two spools (22,23), of which one spool (22) is fastened to said first elongate element (2A) and the other spool (23) to said second elongate element (3A).

9. The device as claimed in claim 8, wherein said band (21) is produced from a material based on glass fibers agglomerated by synthetic resin.

10. The device as claimed in claim 8, wherein a nut (26) is provided at the end (2A2), internal to the second elongate element (3A), of the first elongate element (2A), said nut (26) being capable of coming into abutment against a corresponding shoulder (27) of the second elongate element (3A).

11. The device as claimed in claim 1, wherein said first (7) and second (8) portions are arranged substantially in prolongation of each other.

12. The device as claimed in claim 1, wherein said first (7) and second (8) portions are spaced from and parallel to each other.

13. The device as claimed in claim 1, wherein said elastic return means (4) consists of a plurality of elastic washers (16) seated on the inside of two bell-shaped housings (18,19) which are located opposite one another and of which one (19) is fixed to said first elongate element (2A) and the other (18) is fixed to said second elongate element (3A).

14. The device as claimed in claim 1, wherein a connection (10) between the second elongate element (3A) and the first portion (7) of the lever arm (6) comprises a flexible blade (13) fastened to said second elongate element and to said first portion and parallel to the longitudinal axis (X—X) of said device.

* * * * *

UNITED STATES PATENT AND TRADEMARK OFFICE
CERTIFICATE OF CORRECTION

PATENT NO. : 5,293,974
DATED : March 15, 1994
INVENTOR(S) : Claude Bietenhader, et. al.

It is certified that error appears in the above-indentified patent and that said Letters Patent is hereby corrected as shown below:

Column 7, line 37, delete "pivots".

Signed and Sealed this

Ninth Day of August, 1994

Attest:

BRUCE LEHMAN

Attesting Officer     Commissioner of Patents and Trademarks